United States Patent [19]

McMath et al.

[11] Patent Number: 4,514,168

[45] Date of Patent: Apr. 30, 1985

[54] PROCESS FOR HEATING SOLIDS IN A TRANSFER LINE

[75] Inventors: Henry G. McMath; Gary K. Stenerson, both of Houston, Tex.

[73] Assignee: Exxon Research and Engineering Co., Florham Park, N.J.

[21] Appl. No.: 523,480

[22] Filed: Aug. 15, 1983

[51] Int. Cl.³ .................... F27B 15/00; F26B 3/08
[52] U.S. Cl. .................................. 432/14; 34/10; 209/11; 432/13; 432/16
[58] Field of Search .................. 432/13, 14, 15, 16; 209/11; 34/10, 12

[56] References Cited

U.S. PATENT DOCUMENTS

| | | | |
|---|---|---|---|
| 2,680,091 | 6/1954 | Barr et al. | 202/27 |
| 2,956,347 | 10/1960 | Gordon | 209/11 X |
| 3,004,898 | 10/1961 | Deering | 202/16 |
| 4,028,222 | 6/1977 | Prull | 208/11 R |
| 4,366,046 | 12/1982 | Bertelsen et al. | 208/11 R |
| 4,424,021 | 1/1984 | Merrill, Jr. | 432/14 |
| 4,436,589 | 3/1984 | Petrovic et al. | 432/14 |

Primary Examiner—John J. Camby
Attorney, Agent, or Firm—Yale S. Finkle; Wayne Hoover

[57] ABSTRACT

Oil shale, coal, inert heat transfer material and other carbon-containing solids of varying sizes are preheated with a gas in a transfer line by first separating the solids into a plurality of size fractions and then separately introducing the size fractions into the transfer line at predetermined distances from the transfer line inlet. The predetermined distances are inversely related to the size of the particles comprising each fraction of solids so that the fraction of solids containing the largest particles is introduced nearest to the gas inlet and the fraction of solids containing the smallest particles is introduced at a point furthest away from the transfer line inlet. Normally, solids withdrawn from the transfer line will have been heated to a temperature below which any liquids or gases evolve and are ready for further processing in downstream conversion units such as oil shale retorts, coal gasifiers and the like.

13 Claims, 1 Drawing Figure

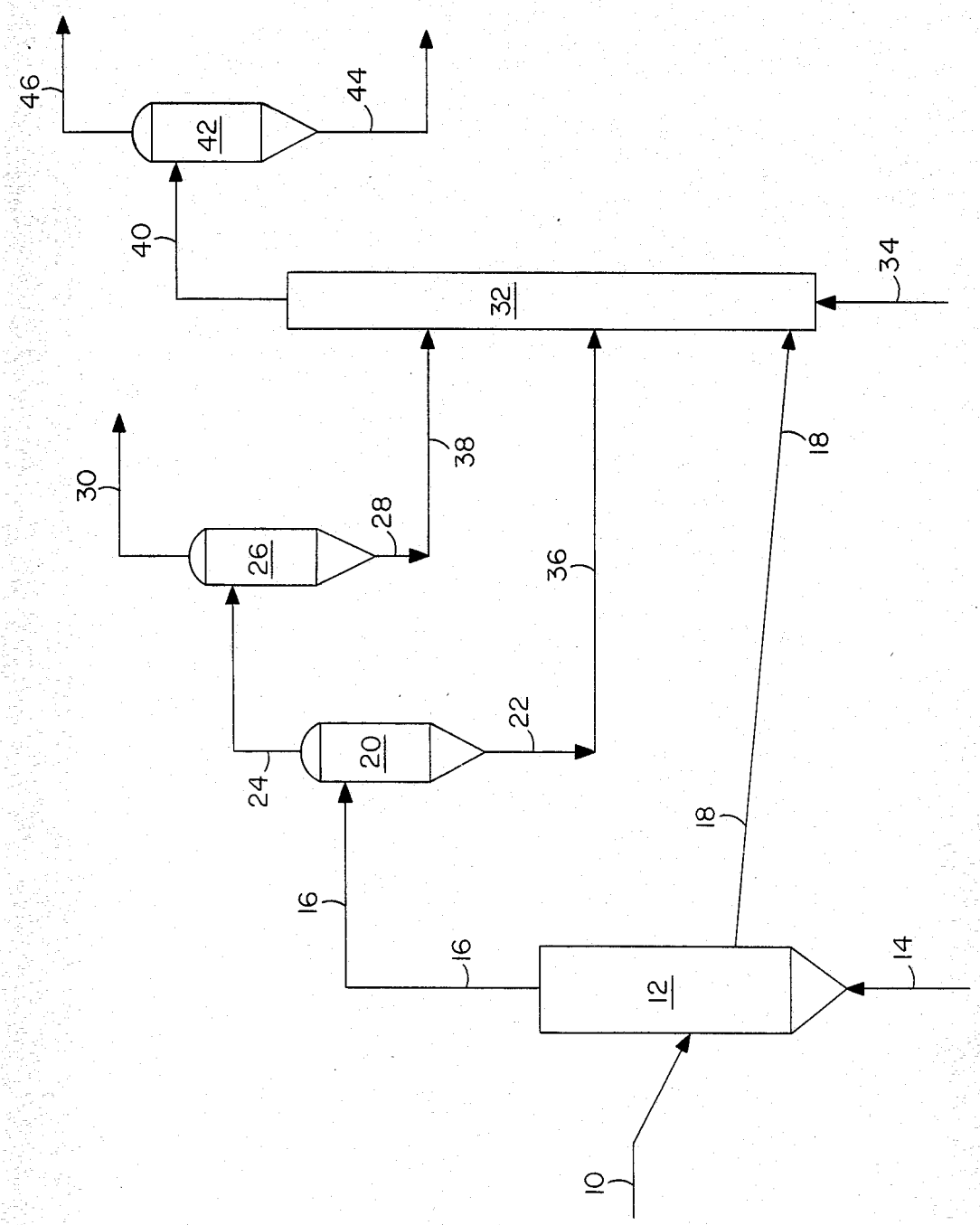

PROCESS FOR HEATING SOLIDS IN A TRANSFER LINE

BACKGROUND OF THE INVENTION

This invention relates to a process for heating solids to prepare them for subsequent processing and is particularly concerned with a process for preheating carbon-containing solids such as oil shale and coal in a transfer line prior to subjecting the carbon-containing solids to a conversion process such as oil shale retorting or coal gasification.

In the retorting of oil shale and in the gasification of coal, the carbon-containing feed material must be heated to high temperatures in order for the desired reactions to occur. The major heat load required in these processes is for heating the feed material to reaction temperatures. In order to efficiently supply this heat, it is common practice to preheat the carbon-containing feed material to a temperature below reaction temperature before introducing it into the reaction zone. Normally, the preheating is carried out by contacting all of the feed solids with hot gases produced in the conversion process. Unfortunately, such a preheating process normally results in loss of yield in the subsequent conversion process even though the preheating is conducted at temperatures below the normal reaction temperature. This premature loss of yield not only results in loss of valuable products in the conversion process but also can contribute to pollution problems because of the presence of hydrocarbons and other contaminants in the gases that are normally vented from the preheater into the atmosphere.

SUMMARY OF THE INVENTION

The present invention provides a process for the preheating of oil shale, coal, similar carbon-containing solids, and other solids which at least in part obviates the disadvantages of the conventional processes referred to above. As used herein, the phrase "carbon-containing solids" refers to any solids that contain organic material. In accordance with the invention, it has now been found that solids composed of particles varying in size can be efficiently preheated in a relatively uniform manner without deleteriously affecting yields in any subsequent conversion process to which the preheated solids are fed by first separating the solids into a plurality of size fractions each of which contain particles of different sizes and then contacting the different size fractions of solids with a hot gas in a transfer line. The hot gas is introduced into the transfer line at a point near one end while one of the size fractions of solids is introduced as a first fraction of solids into the transfer line at or downstream of the point where the hot gas is introduced. One or more of the other size fractions that contain smaller particles than the first fraction are separately introduced into the transfer line at a predetermined distance or distances downstream of the point at which the first size fraction is introduced. The predetermined distance or distances are inversely related to the size of the particles comprising the other size fraction or fractions so that the size fraction of solids containing the smallest particles is introduced into the transfer line at a point furthest away from the point where the first size fraction is introduced. Heated solids are then withdrawn from the transfer line at a relatively uniform temperature, normally a temperature below that at which any liquids or gases are evolved.

The invention is based, at least in part, upon the observation that the smaller particles in the feed material being preheated with a gas in a transfer line heat much faster than the larger particles. In a transfer line heater in which the solids and gas flow cocurrently, the solids temperature increases and the gas temperature decreases as both the solids and gas approach the adiabatic mix temperature or the temperature where heat transfer is at equilibrium from opposite directions. Therefore, when the feed material contains a wide range of particle sizes, the small particles will reach the gas temperature almost instantaneously and normally before the gas temperature has had a chance to decrease significantly below the reaction temperature in the reactor to which the preheated solids will be fed. The overheating of the fines produces undesirable reactions which result in loss of yield and can pose air pollution problems. The larger particles never obtain the adiabatic mix temperature because of heat transfer limitations caused by low heat transfer coefficients. This underheating of the larger particles decreases the thermal efficiency of the preheating process. It has been found that by separating the feed solids into factions of different particle sizes and introducing the smaller size fractions further downstream in the transfer line than the larger fractions, the overheating of the smaller particles and the underheating of the larger particles can be substantially alleviated thereby avoiding yield loss in the subsequent conversion process and air pollution from the transfer line preheater.

BRIEF DESCRIPTION OF THE DRAWING

The drawing is a schematic flow diagram of a solids preheating process carried out in accordance with the invention.

DESCRIPTION OF THE PREFERRED EMBODIMENTS

The process depicted in the drawing is one for the preheating of bituminous coal, subbituminous coal, lignitic coal, petroleum coke, oil shale, tar sands, wood waste and other carbon-containing solids in a transfer line prior to subjecting the solids to processing at higher temperatures. It will be understood that the process is not restricted to the preheating of carbon-containing solids and can be applied to any type of solids which are comprised of particles that vary in size. For example, the process may also be used to preheat inert heat transfer materials such as ceramic and steel balls that are comprised of varying particle sizes.

In the process depicted in the drawing, the carbon-containing feed solids are passed through line 10 from a storage or feed preparation zone, not shown in the drawing, into fluidized vessel or similar segregating device 12. Here the particles comprising the solids are contacted with a fluidizing gas introduced into the bottom of the vessel through line 14. The velocity of the fluidizing gas through vessel 12 is such that the smaller particles in the feed material are entrained in the gas and carried overhead from the vessel through line 16. The particles too large to be entrained in the fluidizing gas are withdrawn from vessel 12 through line 18 and represent the fraction of feed solids containing the largest particles. The fluidizing gas will normally be at ambient temperature and can be any gas which is readily available and will not react with the solids at the temperature of the gas. Normally, the fluidizing gas will be air since it is the cheapest and most abundant gas available. The velocity of the fluidizing gas through vessel 12 will normally range between a velocity which entrains at least the smallest group of particles in the feed material and that velocity which will entrain all of the particles.

The fluidizing gas and entrained particles removed overhead from vessel 12 through line 16 are passed to cyclone separator 20. The velocity of the stream entering the cyclone separator is adjusted such that a fraction of the larger particles present in the cyclone feed is removed through dipleg 22. This fraction of solids will contain particles which are smaller in size than the particles removed from fluidizing vessel 12 through line 18.

The overhead gas from cyclone separator 20 and entrained fines are removed through line 24 and passed to cyclone separator 26 where the fine particulates are removed from the gas and withdrawn through dipleg 28. The fraction of solids withdrawn from dipleg 28 will contain particles smaller than the particles that comprise the fraction of solids withdrawn from cyclone separator 20 through dipleg 22 and the fraction of solids withdrawn from vessel 12 through line 18. The fluidizing gas from which the fine particulates have been separated is taken overhead from separator 26 through line 30 and may be passed into the atmosphere or recovered for reuse in fluidizing vessel 12.

In the above described procedure, the carbon-containing feed solids are divided into three separate size fractions of solids with each fraction containing smaller particles by using a fluidizing vessel and two cyclone separators. It will be understood that the process of the invention is not limited to dividing the feed solids into three separate size fractions or to the use of a fluidizing vessel and cyclone separators. The feed solids can be divided into any number of size fractions greater than one. Preferably, the feed is divided into three to five different size fractions. Also, conventional screens and sink/float techniques can be used to carry out the separations in lieu of a fluidizing vessel and cyclone separator.

Referring again to the drawing, the fraction of solids containing the particles of largest size removed from the carbon-containing feed material in fluidizing vessel 12 is passed through line 18 into transfer line 32 at a point near the bottom. Here the larger-sized particles are entrained in an upflowing stream of hot gas introduced through line 34 into the bottom of transfer line 32. The fraction of solids containing the largest particles is introduced at a point downstream of the point at which the hot gas is introduced into the transfer line. The hot gas may be any gas which will not react with the carbon-containing particles as they pass through the transfer line and are subjected to various temperatures. The gas may be a relatively pure stream of methane, nitrogen, helium or hydrogen. Preferably, the gas will be a flue gas containing a mixture of carbon oxides, nitrogen, oxygen, water vapor and unburned hydrocarbons. The gas will always be at a temperature greater than at least some of the solids introduced into the transfer line. In general, the temperature of the hot gas will range between about ambient and about 2000° F. and will depend upon the type of carbon-containing solids fed to the transfer line and the desired adiabatic mix temperature of the gas and solids eventually withdrawn from the transfer line.

Transfer line 32 may be any system in which particles are transferred from one point to another by a gas. Such systems include lift pipes, fast-fluidized beds and risers. Although the transfer line shown in the drawing is vertical and the gas and solids flow upwardly, it will be understood that the invention is not limited to such a configuration. The solids and gas may flow downwardly through a vertical transfer line, they may flow horizontally through a horizontal transfer line or they may flow cocurrently through an inclined transfer line. All that is necessary is that the gas and solids flow cocurrently through the transfer line. The transfer line does not necessarily have to be a straight conduit. For example, it may be S-shaped or any other shape desired in order to effect the transfer of solids to their ultimate place of use.

In conventional preheating operations, the solids to be preheated contain particles of varying sizes, and all the particles are introduced at the same point in the transfer line. It has now been found that such a procedure is undesirable because the smaller particles comprising the solids tend to heat much faster than the larger particles and therefore will reach temperatures much higher than the larger particles. These temperatures in most cases will be temperatures at which conversion of the carbon-containing solids begins, thus causing loss of yields in the subsequent conversion process and undesired emissions from the transfer line into the atmosphere. The smaller particles tend to heat faster than the larger particles because they have a higher surface to mass ratio and a larger gas to particle heat transfer coefficient. The larger particles, on the other hand, tend to underheat in the transfer line and this results in a decrease in overall process thermal efficiency. It has now been found that overheating of the smaller particles and underheating of the larger particles can be substantially avoided in a transfer line preheater by dividing the feed material into different size fractions and introducing the fraction of solids containing the smallest particles furthest away from the inlet of the transfer line while the fraction of solids containing the largest particles is introduced into the transfer line at a point near where the heating gas is introduced. The size fractions of solids containing the intermediate size particles are then introduced into the transfer line at points between where the smallest and largest size fractions are introduced such that the distances of the point of introduction downstream of where the largest size fraction is introduced is inversely related to the size of the particles comprising each intermediate size fraction.

Referring again to the drawing, the fraction of solids containing intermediate size particles removed from cyclone separator 20 through dipleg 22 is passed through line 36 into transfer line 32 at a point downstream of the point where the fraction containing the largest size particles is introduced into the transfer line through line 18. Similarly, the fraction of solids containing the smallest particles removed from separator 26 through dipleg 28 is passed through line 38 into transfer line 32 at a point downstream of where the intermediate size fraction is introduced. A mixture of gas and solids of varying sizes is removed overhead of transfer line 32 through line 40 and passed to cyclone separator or similar device 42. The temperature at which the gas and solids exit the transfer line approaches the adiabatic mix temperature. This is the temperature at which heat transfer between the gas and solids in the transfer line has come to equilibrium. Normally, the gas introduced into transfer line 32 through line 34 is at a higher temperature than the adiabatic mix temperature while each fraction of solids introduced into the transfer line through lines 18, 36 and 38 is at a temperature lower than the adiabatic mix temperature. In the transfer line, the gas decreases in temperature while the solids increase in temperature as both the solids and gas approach the adiabatic mix temperature. By introducing the larger particles of solids near the inlet of the transfer line and then separately introducing the smaller fraction of particles downstream at distances inversely related to the size of particles, the temperature of the larger particles tends to more nearly approach the adiabatic mix temperature, whereas the temperature of the smaller particles is prevented from increasing to a value so much greater than the adiabatic mix temperature that undesirable reactions begin to occur.

Normally, the adiabatic mix temperature is set as high as possible but at such a level that the temperature of the individual particles introduced into the transfer line do not reach a value at which undesired reactions begin to occur. In any case, the adiabatic mix temperature is set such that the temperature of the particles exiting transfer line 32 through line 40 will be below the temperature at which any liquids or gases are evolved from the carbon-containing solids. This temperature, of course, will depend upon the nature of the carbon-containing feed solids. If the feed solids are oil shale, the temperature of the exiting solids will normally be maintained at a value between about 200° F. and about 800° F. On the other hand, if the feed solids are coal, the exit temperature will normally be between about 400° F. and about 800° F. The distances from the inlet of the transfer line to where the individual fractions of particles are introduced will depend upon the desired particle exit temperature and the size of the particles in the particular fraction. The smaller the particles, the closer to the outlet of the transfer line the introduction point will normally be.

The solids and gas removed overhead from transfer line 32 through line 40 are passed to separator 42 where the solids are removed from the gas downward through dipleg 44. These solids have been preheated to a temperature below that at which gases or liquids evolve and are ready for passage to downstream processing units. Normally, these units will comprise an oil shale retort, a coal gasifier, a coal liquefier or some other similar reactor. The gas from which the solids are removed is withdrawn overhead of separator 42 through line 46 and can be admitted into the atmosphere, passed downsteam for further processing or recycled to vessel 12.

In the embodiment of the invention described above and depicted in the drawing, the carbon-containing feed solids to be preheated are divided into three fractions of solids comprised of particles of different sizes and each fraction is subsequently introduced into the transfer line 32. It will be understood that the feed solids can be divided into a greater number of size fractions and that not all of the size fractions need be introduced into the transfer line. For example, if the feed solids are divided into five different size fractions, it may be desirable to discard the largest and/or smallest size fraction and to introduce only the other size fractions into the transfer line. If this is done, the largest of the other size fractions is introduced near the inlet of the transfer line and the other fractions are introduced downstream at predetermined distances inversely related to size.

It will be apparent from the foregoing that the invention provides a method for preheating solids in a transfer line in such a manner as to avoid overheating of small particles and underheating of large particles. This, in turn, prevents premature loss of yield in downstream conversion processes and avoids any potential air pollution problems caused by treatment in the transfer line.

We claim:

1. A process for preheating solids containing particles of varying sizes without deleteriously affecting yields in a subsequent conversion process to which the preheated solids are fed by contacting said solids with a hot gas in a transfer line which comprises:
    (a) separating said solids into a plurality of size fractions;
    (b) introducing said hot gas into said transfer line at a point near one end;
    (c) introducing a size fraction of solids produced in step (a) as a first fraction of solids into said transfer line at or downstream of the point where said hot gas is introduced;
    (d) separately introducing one or more other size fractions of solids produced in step (a) that contain smaller particles than said first fraction into said transfer line at a predetermined distance or distances downstream of where said first size fraction is introduced, wherein the predetermined distance or distances are inversely related to the size of the particles comprising the other size fraction or fractions so that the size fraction of solids containing the smallest particles is introduced into said transfer line at a point furthest away from the point where said first size fraction is introduced; and
    (e) withdrawing preheated solids from said transfer line which are ready for passage to downstream processing units.

2. A process as defined by claim 1 wherein said solids comprise carbon-containing solids.

3. A process as defined by claim 1 wherein said solids comprise inert heat transfer material.

4. A process as defined by claim 2 wherein said carbon-containing solids comprise oil shale.

5. A process as defined by claim 2 wherein said carbon-containing solids comprise coal.

6. A process as defined by claim 1 wherein said hot gas comprises a flue gas.

7. A process as defined by claim 1 wherein said solids are separated into three to five size fractions.

8. A process as defined by claim 1 wherein said solids are separated into a plurality of size fractions utilizing a fluidized bed vessel and cyclone separators.

9. A process as defined by claim 1 wherein said transfer line comprises a lift pipe.

10. A process as defined by claim 1 wherein said transfer line comprises a riser.

11. A process as defined by claim 1 wherein said transfer line comprises a fast fluidized bed.

12. A process as defined by claim 1 wherein said solids are separated into five or more size fractions and the fractions containing the largest and smallest particles are not introduced into the said transfer line.

13. A process as defined by claim 2 wherein the solids withdawn from said transfer line are at a temperature below which any liquids or gases are evolved.

* * * * *